United States Patent
Nakamura (10) Patent No.: US 8,323,822 B2
(45) Date of Patent: Dec. 4, 2012

(54) POWER STORAGE DEVICE WITH DIFFERENT ELECTROLYTE LAYERS IN STACK

(75) Inventor: Yoshiyuki Nakamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 905 days.

(21) Appl. No.: 12/087,789

(22) PCT Filed: Nov. 7, 2007

(86) PCT No.: PCT/JP2007/071627
§ 371 (c)(1),
(2), (4) Date: Jul. 15, 2008

(87) PCT Pub. No.: WO2008/059740
PCT Pub. Date: May 22, 2008

(65) Prior Publication Data
US 2009/0017371 A1    Jan. 15, 2009

(30) Foreign Application Priority Data
Nov. 15, 2006  (JP) ................................ 2006-309139

(51) Int. Cl.
*H01M 10/058* (2010.01)
*H01M 10/50* (2006.01)
*H01M 6/24* (2006.01)

(52) U.S. Cl. ......... 429/152; 429/304; 429/142; 429/122

(58) Field of Classification Search ........................ None
See application file for complete search history.

(56) References Cited

U.S. PATENT DOCUMENTS

| | | | |
|---|---|---|---|
| 2006/0127763 A1* | 6/2006 | Watanabe et al. | 429/209 |
| 2006/0292443 A1* | 12/2006 | Ogg et al. | 429/185 |
| 2009/0269665 A1 | 10/2009 | Nakamura | |

FOREIGN PATENT DOCUMENTS

| | | |
|---|---|---|
| DE | 11 2007 002 557 T5 | 10/2009 |
| JP | 01-137567 A | 5/1989 |
| JP | 07-263019 A | 10/1995 |
| JP | 2000-058017 A | 2/2000 |
| JP | 2004-164897 A | 6/2004 |
| JP | 2005-340089 A | 12/2005 |
| JP | 2005340089 A * | 12/2005 |
| JP | 2006-173001 A | 6/2006 |

OTHER PUBLICATIONS

Office Action issued Jul. 26, 2011 in DE 11 2007 001 063.0-45 with English translation thereof.

* cited by examiner

*Primary Examiner* — Keith Walker
(74) *Attorney, Agent, or Firm* — Kenyon & Kenyon LLP (57) ABSTRACT

In a stacked battery including a plurality of electrolyte layers having substantially the same resistance value, an uneven temperature distribution during charge and discharge changes the resistance values of solid electrolyte layers to cause variations in output among a plurality of unit cells in a stacking direction. A power storage device includes a plurality of electrolyte layers which are stacked with an electrode element interposed between them, wherein the plurality of electrolyte layers include an electrolyte layer provided at a first position in a stacking direction and an electrolyte layer provided at a second position different from the first position, heat radiation being lower at the second position than at the first position, and the electrolyte layer at the second position has a resistance value higher than that of the electrolyte layer at the first position.

5 Claims, 6 Drawing Sheets

POWER STORAGE DEVICE WITH DIFFERENT ELECTROLYTE LAYERS IN STACK

This is a 371 national phase application of PCT/JP2007/071627 filed 7 Nov. 2007, claiming priority to Japanese Patent Application No. 2006-309139 filed 15 Nov. 2006, the contents of which are incorporated herein by reference.

TECHNICAL FIELD

The present invention relates to a power storage device such as an assembled battery provided by stacking a plurality of unit cells.

BACKGROUND ART

Power storage devices such as secondary batteries have conventionally been used as a power source of an electric vehicle (EV), a hybrid electric vehicle (HEV), and a fuel cell vehicle (FCV). To satisfy the need for high power, an assembled battery is provided by electrically connecting a plurality of unit cells in series (see, for example, Patent Document 1).

[Patent Document 1] Japanese Patent Publication No. 2004-164897 (FIG. 1)

DISCLOSURE OF THE INVENTION

[Problems to be Solved by the Invention]

The assembled battery formed of a plurality of stacked unit cells suffers from an uneven temperature distribution in a stacking direction resulting from charge and discharge of the battery and the like. Specifically, the temperature of a unit cell located closer to the central layer is higher than that of a unit cell located closer to an outer layer since the unit cell closer to the central layer has lower heat radiation and tends to hold more heat.

Since all of the unit cells included in a conventional assembled battery have the same structure, the abovementioned uneven temperature distribution in the stacking direction changes resistance values in the unit cells. Specifically, the resistance value in the unit cell located in the central layer is reduced. This causes variations in voltage value among the plurality of unit cells in the stacking direction.

In the assembled battery, charge and discharge are typically controlled such that each unit cell is not overcharged or overdischarged beyond predetermined charge/discharge voltage values.

If the voltage value varies among the plurality of unit cells as described above, the control of charge and discharge should be performed on the basis of the unit cell presenting the lowest voltage value. In such a case, all of the unit cells constituting the assembled battery cannot be used or charged and discharged uniformly.

It is thus an object of the present invention to provide a power storage device capable of repressing variations in output among a plurality of unit cells in a stacking direction.

[Means for Solving Problems]

The present invention provides a power storage device comprising a plurality of electrolyte layers which are stacked with an electrode element interposed between them, wherein the plurality of electrolyte layers include an electrolyte layer provided at a first position in a stacking direction and an electrolyte layer provided at a second position different from the first position, heat radiation being lower at the second position than at the first position, and wherein the electrolyte layer at the second position has a resistance value higher than a resistance value of the electrolyte layer at the first position.

Specifically, when the electrolyte layer is a solid electrolyte layer containing a group of particles, the electrolyte layer at the second position may contain the group of particles at a density lower than that of the group of particles the electrolyte layer at the first position.

The different densities of the particle groups in the electrolyte layers can be realized by varying the average particle diameter of the particle groups in the electrolyte layers. When the electrolyte layer includes binding agent for binding the particles, the different densities of the particle groups in the electrolyte layers can be realized by varying the amount of the binding agent.

The electrolyte layer at the second position may have a thickness larger than that of the electrolyte layer at the first position. The electrolyte layer at the first position may be of a type different from that of the electrolyte layer at the second position. For example, it is possible to use materials having different levels of ion conduction or mix materials having different levels of ion conduction at varying ratios depending on the position of the electrolyte layer in the stacking direction.

The electrolyte layer at the second position and the electrode element in contact with the electrolyte layer at the second position may be smaller than the electrolyte layer at the first position and the electrode element in contact with the electrolyte layer at the first position in a plane orthogonal to the stacking direction.

The second position may correspond to a substantially central position in the stacking direction. In this case, the resistance value of the plurality of electrolyte layers may be increased from the outer layer to the central layer in the stacking direction.

[Effects of the Invention]

In the present invention, the resistance value of the electrolyte layer provided at the second position where heat radiation is lower than at the first position is previously set to be larger than the resistance value of the electrolyte layer provided at the first position. This can repress variations in output among the unit cells at different positions in the stacking direction even when an uneven temperature distribution occurs in the stacking direction due to charge and discharge of the power storage device.

BEST MODE FOR CARRYING OUT THE INVENTION

Preferred embodiments of the present invention will hereinafter be described.

[Embodiment 1]

Figure 1:
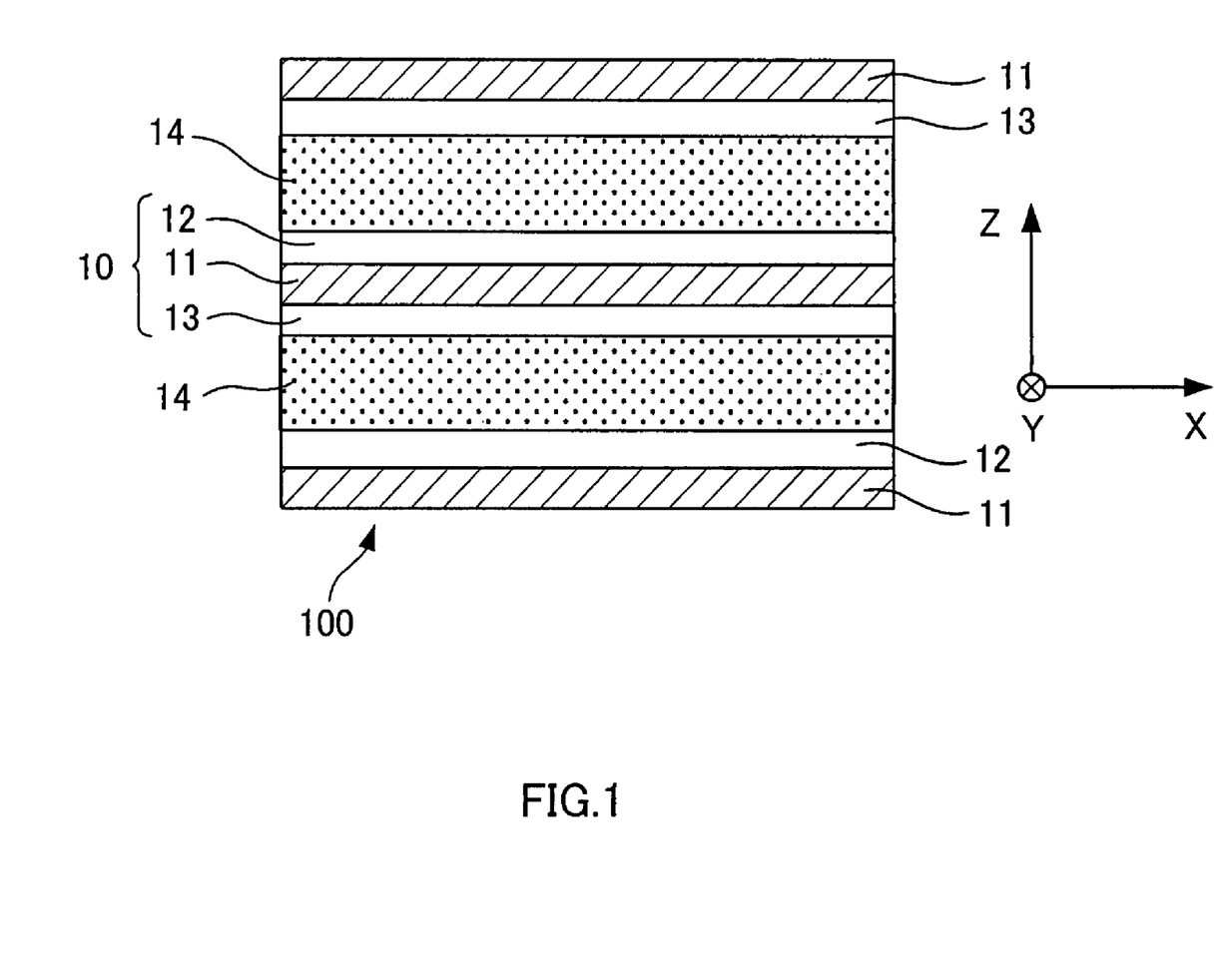
[FIG. 1] A section view showing the structure of part of a bipolar battery according to the present invention.
Figure 2:
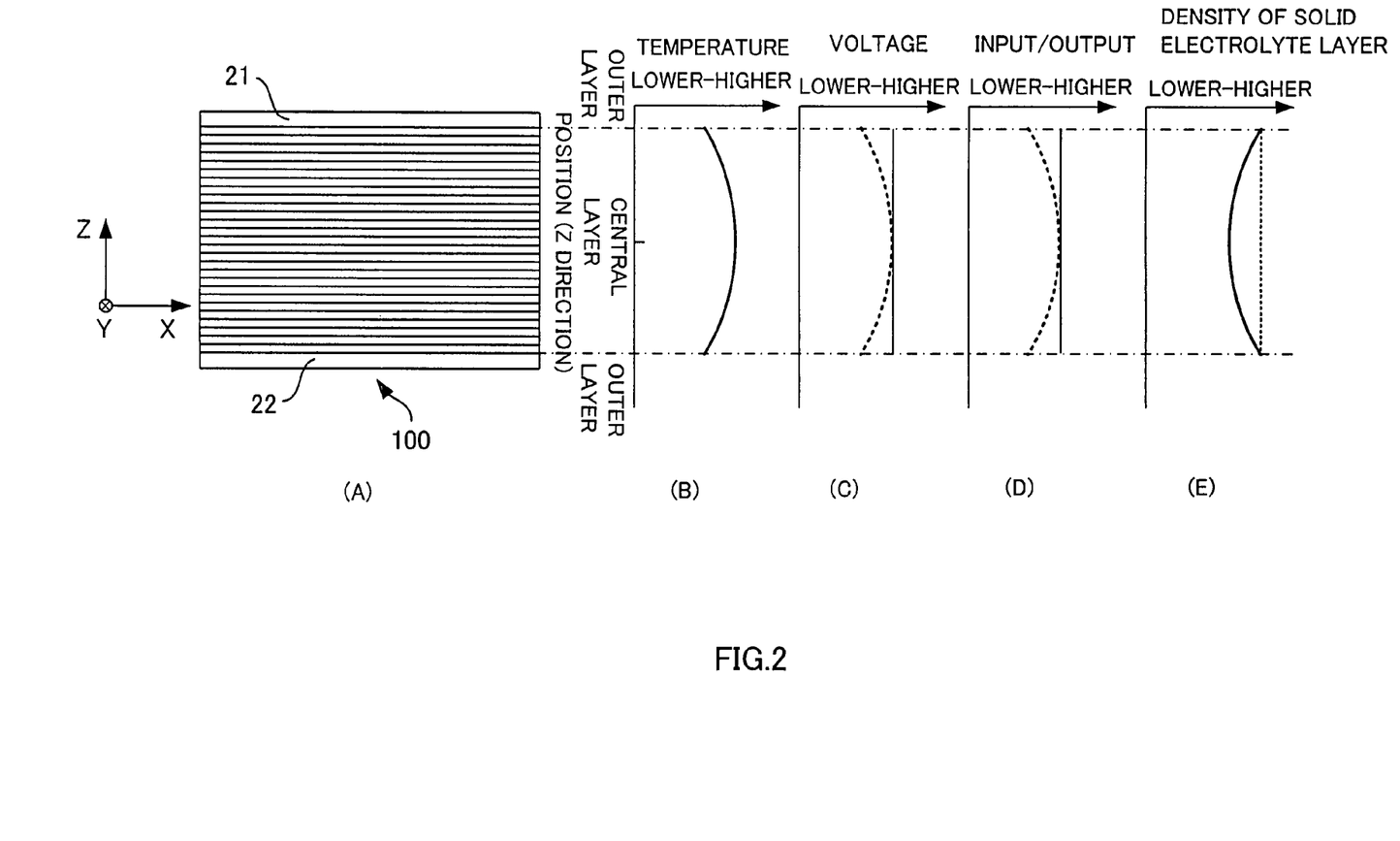
[FIG. 2] Graphs showing the relationships between the position in a stacking direction and the temperature, voltage value, input/output value, and density of particle groups contained in solid electrolyte layers in Embodiment 1 of the present invention (sections A to E).

A bipolar battery (secondary battery) which is Embodiment 1 of the present invention will hereinafter be described with reference to FIGS. 1 and 2. FIG. 1 is a section view showing the structure of part of the bipolar battery. FIG. 2 shows graphs of temperature distribution, voltage distribution, input/output distribution, and density distribution of particle groups contained in solid electrolyte layers along a stacking direction of the bipolar battery.

The bipolar battery 100 of Embodiment 1 is an assembled battery provided by stacking a plurality of unit cells. Specifically, as shown in FIG. 1, the bipolar battery 100 has a structure in which a plurality of bipolar electrodes 10 are stacked with solid electrolyte layers 14 interposed between them.

The unit cell refers to a power generation element formed of the solid electrolyte layer 14, a positive electrode layer 12, and a negative electrode layer 13, in which the layers 12 and 13 are placed on both sides of the solid electrolyte layer 14, respectively.

Each bipolar electrode 10 includes a collector 11, a positive electrode layer 12, and a negative electrode layer 13, in which the layers 12 and 13 are formed on both sides of the collector 11, respectively. The positive electrode layer 12 and the negative electrode layer 13 can be formed on the collector 11 with an ink-jet method, for example. Each of the positive electrode layer 12 and the negative electrode layer has a substantially uniform thickness (including some allowable manufacturing errors).

While Embodiment 1 is described in conjunction with the bipolar secondary battery, the present invention is applicable to another secondary battery other than the bipolar type. A secondary battery other than the bipolar type can utilize an electrode having the same type of electrode layer (positive electrode layer or negative electrode layer) formed on both sides of a collector or an electrode having an electrode layer only on one side of a collector.

While the secondary battery is described below in Embodiments 1 to 4, the present invention is applicable to a stacked capacitor (electric double layer capacitor) serving as a power storage device.

The collector 11 can be formed of, for example, aluminum foil or a plurality of types of metal (alloy). The collector 11 can also be provided by covering a surface of metal with aluminum.

The collector 11 can be formed of a so-called composite collector consisting of a plurality of bonded metal foil sheets. When the composite collector is used, a positive electrode collector can be made of aluminum or the like and a negative electrode collector can be made of nickel or copper. The composite collector can include a positive electrode collector and a negative electrode collector in direct contact with each other or can include a conductive layer between a positive electrode collector and a negative electrode collector.

The positive electrode layer 12 formed on one of the opposite surfaces of the collector 11 contains an active material appropriate for the positive electrode. The electrode layer 12 can include a conductive agent, a binder, a polymer gel electrolyte for increasing ionic conduction, a polyelectrolyte, and an additive as required.

The negative electrode layer 13 formed on the other surface of the collector 11 contains an active material appropriate for the negative electrode. The electrode layer 13 can include a conductive agent, a binder, a polymer gel electrolyte for increasing ionic conduction, a polyelectrolyte, and an additive as required.

Known materials can be used for forming the electrode layers 12 and 13.

For a nickel metal hydride (NiMH) battery, by way of example, a nickel oxide can be used as the active material of the positive electrode layer 12, while a hydrogen storing alloy such as $MmNi_{(5-x-y-z)}Al_xMn_yCo_z$ (Mm: misch metal) can be used as the active material of the negative electrode layer 13. For a lithium secondary battery, a lithium transition metal composite oxide can be used as the active material of the positive electrode layer 12, while carbon can be used as the active material of the negative electrode layer 13. As the conductive agent, acetylene black, carbon black, graphite, carbon fiber, and carbon nanotube can be used.

Each of the solid electrolyte layers 14 is placed between two bipolar electrodes 10. Specifically, the solid electrolyte layer 14 is sandwiched between the positive electrode layer 12 of one bipolar electrode 10 and the negative electrode layer 13 of the other bipolar electrode 10. The solid electrolyte layer 14 has a generally uniform thickness (including some allowable manufacture errors).

The solid electrolyte layer 14 includes a group of particles formed of a plurality of particles and a binding agent for binding the particles. An inorganic solid electrolyte or a polymer solid electrolyte can be used as the solid electrolyte layer 14.

For example, a nitride, a halide, an oxysalt, and a phosphorus sulfide compound of Li can be used as the inorganic solid electrolyte. More specifically, $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, $Li_2SiS_3$, $Li_2O$—$B_2O_3$, $Li_2O_2$—$SiO_2$, $Li_2S$—$GeS_4$, $Li_2S$—$P_2S_5$, $LiI$—$Li_2S$—$P_2S_5$ can be used.

As the polymer solid electrolyte, it is possible to use a material made of the electrolyte as described above and a polymer for dissociation of the electrolyte or a material including a polymer having an ion dissociation group, for example. It is possible to use, as the polymer for dissociation of the electrolyte, a polyethylene oxide derivative and a polymer containing the derivative, or a polypropylene oxide derivative and a polymer containing the derivative, or a phosphate polymer, for example. The inorganic solid electrolyte and the polymer solid electrolyte may be used in combination.

When a sulfide is used as the material forming the solid electrolyte layer 14 in the lithium secondary battery utilized to provide the bipolar battery 100, the conductivity of lithium ion can be improved. Examples of the sulfide can include lithium sulfide and silicon sulfide.

The bipolar battery 100 of Embodiment 1 is constituted by arranging the structures as shown in FIG. 1 in succession in a Z direction (stacking direction). As shown in section (A) of FIG. 2, a positive electrode terminal 21 and a negative electrode terminal 22 are provided at both ends in the stacking direction for use in charge and discharge of the bipolar battery 100. The positive electrode terminal 21 and the negative electrode terminal 22 are connected to a circuit for controlling charge and discharge of the bipolar battery 100.

In the bipolar battery 100 of Embodiment 1, the solid electrolyte layers 14 have different constituents depending on the position in the stacking direction (Z direction). Specifically, as shown in section (E) of FIG. 2, the solid electrolyte layer 14 located in the central layer contains the particle group at the lowest density, while the solid electrolyte layer 14 located in the outer layer (outermost layer) contains the particle group at the highest density.

The solid electrolyte layers 14 located between the central layer and the outer layer contain the particle groups such that the density thereof is increased from the central layer to the outer layer.

The density of the particle group in each of the solid electrolyte layers 14 is substantially uniform (including some allowable manufacture errors).

For achieving the varying densities of the particle groups contained in the solid electrolyte layers 14, the particle groups can have different average diameters. Specifically, the different average diameters of the particle groups contained in the solid electrolyte layers 14 are provided such that the solid electrolyte layer 14 located in the central layer contains the particle group having the largest average diameter and the solid electrolyte layer 14 located in the outer layer contains the particle group having the smallest average diameter. In other words, the solid electrolyte layer 14 located in the central layer contains the particle having the largest diameter and the solid electrolyte layer 14 located in the outer layer contains the particle having the smallest diameter.

The solid electrolyte layers 14 located between the central layer and the outer layer are provided such that the average diameter of the particle groups is reduced from the central layer to the outer layer. In other words, the diameter of the particle is reduced from the central layer to the outer layer.

Alternatively, the density of the particle groups contained in the solid electrolyte layers 14 can be varied by using particle groups having substantially the same diameter (particular average diameter) and including varying amounts of binding agent in the solid electrolyte layers 14. Specifically, the solid electrolyte layer 14 located in the central layer contains the largest amount of binding agent, while the solid electrolyte layer 14 located in the outer layer contains the smallest amount of binding agent. The solid electrolyte layers 14 located between the central layer and the outer layer are provided such that the amount of binding agent is reduced from the central layer to the outer layer.

Alternatively, the diameter of the particle groups can be varied and the amount of binding agent can be varied at the same time depending on the position of the solid electrolyte layer 14 in the stacking direction. In this case, the density of the particle group in the solid electrolyte layer 14 located on the central layer side may be lower than that of the particle group in the solid electrolyte layer 14 located on the outer layer side.

The bipolar battery 100 formed of the plurality of stacked unit cells shows an uneven temperature distribution in the stacking direction as shown in section (B) of FIG. 2. The temperature is at the highest level in the central layer and at the lowest level in the outer layer. This is due to heat generation associated with charge and discharge of the bipolar battery 100. A unit cell located on the central layer side has lower heat radiation and tends to hold more heat than a unit cell located on the outer layer side.

In this case, if all of the solid electrolyte layers 14 in the stacking direction contain the particle groups having substantially the same density (as shown by a dotted line in section (E) of FIG. 2), the temperature of the solid electrolyte layer 14 located in the central layer rises to cause a reduction in resistance value. This results in disadvantageous variations in voltage value and input/output value among the plurality of unit cells in the stacking directions as shown by dotted lines in sections (C) and (D) of FIG. 2.

If all of the solid electrolyte layers 14 contain the particle groups having substantially the same density, all of the solid electrolyte layers 14 have substantially the same resistance value before variations occur in temperature along the stacking direction (in other words, before the bipolar battery 100 is used). However, as the bipolar battery 100 is used (including charge and discharge), the temperature is varied in the stacking direction to change the resistance values of the solid electrolyte layers 14 in the stacking direction.

As described above, the solid electrolyte layers 14 contain the particle groups at the varying densities depending on the position of the solid electrolyte layer 14 in the stacking direction in Embodiment 1. When the density of the particle group in the solid electrolyte layer 14 is reduced, the resistance value of that solid electrolyte layer 14 can be increased. When the density of the particle group in the solid electrolyte layer 14 is increased, the resistance value of that solid electrolyte layer 14 can be reduced.

The resistance value of the solid electrolyte layers 14 is varied previously in this manner depending on the position in the stacking direction. Even when charge and discharge of the bipolar battery 100 causes the uneven temperature distribution shown in section (B) of FIG. 2, it is possible to prevent variations in resistance value among the solid electrolyte layers 14 in the stacking direction. The prevention of variations in resistance value can repress variations in voltage value and input/output value in the bipolar battery 100. For example, as shown by solid lines in sections (c) and (D) of FIG. 2, substantially constant voltage value and input/output value can be accomplished.

The density distribution shown in section (E) of FIG. 2 can be set on the basis of the temperature distribution in the stacking direction (section (B) of FIG. 2). Specifically, once the temperature distribution in the stacking direction occurred due to charge and discharge of the bipolar battery 100 is previously determined, the voltage change in each unit cell resulting from the temperature changes can be obtained.

Then, the resistance value of the solid electrolyte layer 14 included in each unit cell can be set on the basis of the voltage change in each unit cell. The resistance value of each solid electrolyte layer 14 can be set so as to prevent the variations in the changed voltage value among the unit cells in the stacking direction.

The solid electrolyte layers 14 constituted as in Embodiment 1 can prevent variations in the voltage value and input/output value among the plurality of unit cells in the stacking direction, so that all of the unit cells in the bipolar battery 100 can be controlled for charge and discharge based on the same reference.

In a secondary battery, it is known that the battery life is affected adversely by input/output voltages beyond a predetermined voltage range including an upper limit value and a lower limit value. To extend the battery life, a fail-safe is typically provided such that charge and discharge are not performed beyond the predetermined voltage range. In Embodiment 1, such control of charge and discharge can be performed under the same conditions on all of the unit cells.

The resistance values of all of the solid electrolyte layers 14 in the stacking direction can be set with the solid electrolyte layer 14 located in the central layer used as the reference. This can realize the input/output value corresponding to the highest input/output value of a conventional bipolar battery (shown by the dotted line) as shown in section (D) of FIG. 2.

While the density of the particle groups in the solid electrolyte layers 14 is set on the basis of the density distribution shown by the curve in section (E) of FIG. 2 in Embodiment 1, the present invention is not limited thereto. It is necessary only that the density of the particle groups in the solid electrolyte layers 14 should be varied so as to prevent variations in the voltage value among the plurality of unit cells resulting from variations in the temperature in the stacking direction.

For example, it is possible to simply set the density of the particle group in the solid electrolyte layer 14 located in the central layer to be lower than the density of the particle group in a solid electrolyte layer 14 located in an outer layer. This can prevent variations in the voltage value between the unit cell located in the central layer and the unit cell located in the outer layer. The bipolar battery 100 may include at least two solid electrolyte layers 14 containing particle groups at substantially the same density.

(Embodiment 2)

Next, a bipolar battery (secondary battery) which is Embodiment 2 of the present invention will be described with reference to FIG. 3 which corresponds to FIG. 2 in Embodiment 1. The section (E) of FIG. 3 shows the relationship between the position in a stacking direction and the thickness of solid electrolyte layer.

A bipolar battery 101 of Embodiment 2 has a structure substantially similar to that of the bipolar battery 100 described in Embodiment 1. In the following description, members having the same functions as those of the members described in Embodiment 1 are designated with the same reference numerals. The following description will mainly focus on differences from Embodiment 1.

In Embodiment 2, the thickness of solid electrolyte layers 14 (length in a Z direction) is varied depending on the position in the stacking direction (Z direction). Specifically, the solid electrolyte layer 14 located in the central layer has the largest thickness, while the solid electrolyte layer 14 located in the outer layer has the smallest thickness.

Figure 3:
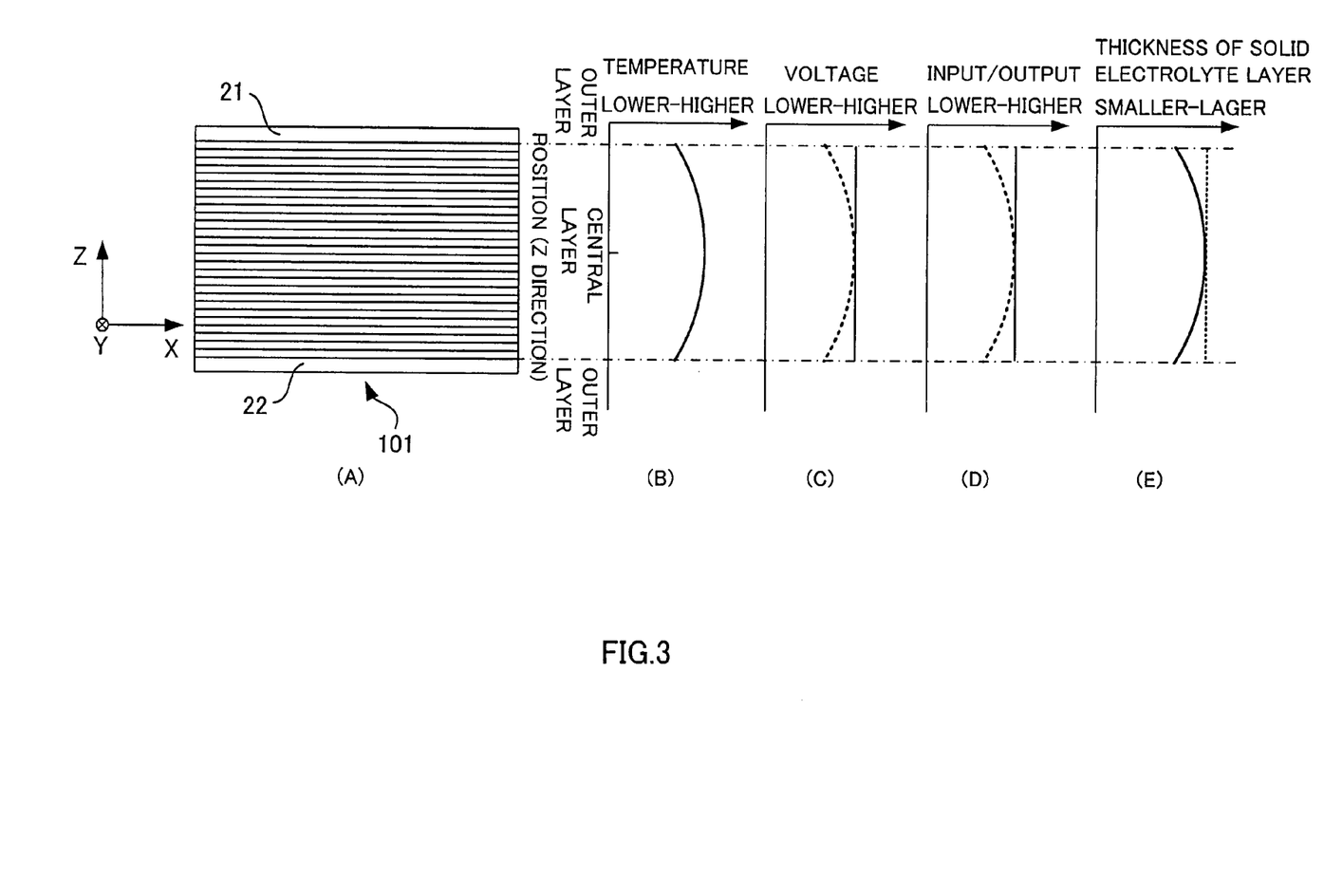
[FIG. 3] Graphs showing the relationships between the position in a stacking direction and the temperature, voltage value, input/output value, and thickness of solid electrolyte layers in Embodiment 2 of the present invention (sections A to E).

The solid electrolyte layers 14 located between the central layer and the outer layer are formed such that the thickness thereof is reduced from the central layer to the outer layer as shown in section (E) of FIG. 3. Each of the solid electrolyte layers 14 has a substantially uniform thickness (including some allowable manufacture error).

As described in Embodiment 1, the unit cell located in the central layer is at the highest temperature, and the solid electrolyte layer 14 in that unit cell has a lower resistance value. If all of the solid electrolyte layers 14 in the bipolar battery 101 have substantially the same thickness, variations occur in voltage value and input/output value among a plurality of unit cells in the stacking direction as shown by dotted lines in sections (c) and (D) of FIG. 3. This is because charge and discharge of the bipolar battery 101 causes an uneven temperature distribution in the stacking direction to produce variations in resistance value among the plurality of unit cells in the stacking direction.

As described above, the solid electrolyte layers 14 have different thicknesses depending on the position of the solid electrolyte layer in the stacking direction in Embodiment 2. When the thickness of the solid electrolyte layer 14 is increased, the resistance value of the solid electrolyte layer 14 can be increased. When the thickness of the solid electrolyte layer 14 is reduced, the resistance value of the solid electrolyte layer 14 can be reduced.

The resistance value of the solid electrolyte layers 14 is varied previously in this manner depending on the position in the stacking direction. Even when charge and discharge of the bipolar battery 101 causes the uneven temperature distribution shown in section (B) of FIG. 3, it is possible to prevent variations in resistance value among the solid electrolyte layers 14 in the stacking direction. The prevention of variations in resistance value can repress variations in voltage value and input/output value in the bipolar battery 101. For example, as shown by solid lines in sections (C) and (D) of FIG. 3, substantially constant voltage value and input/output value can be achieved.

The thickness distribution shown in section (E) of FIG. 3 can be set on the basis of the temperature distribution in the stacking direction (section (B) of FIG. 3). Specifically, once the temperature distribution in the stacking direction occurred due to charge and discharge of the bipolar battery 101 is previously determined, the voltage change in each unit cell resulting from the temperature changes can be obtained.

Then, the thickness of the solid electrolyte layer 14 included in each unit cell can be set on the basis of the voltage change in each unit cell. The thickness of each solid electrolyte layer 14 can be set so as to prevent the variations in the changed voltage value among the unit cells in the stacking direction.

Embodiment 2 can provide the similar effects to those in Embodiment 1. In addition, Embodiment 2 allows a reduction in the thickness of the bipolar battery 101 by varying the thickness of the solid electrolyte layers 14 as compared with a conventional bipolar battery including a plurality of solid electrolyte layers having substantially the same thickness.

While Embodiment 2 has been described in conjunction with the use of the solid electrolyte layer 14, the present invention is not limited thereto. A liquid or gel electrolyte can be used, for example.

Figure 4:
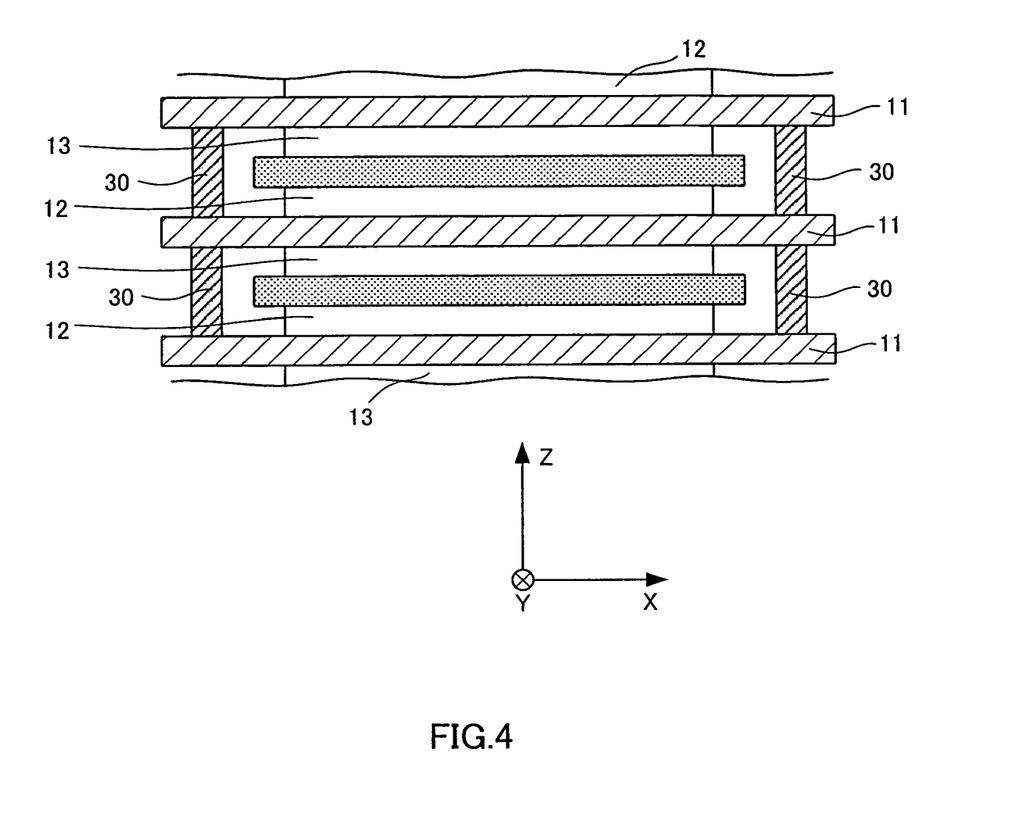
[FIG. 4] A section view showing the structure of part of a bipolar battery which is a modification of Embodiment 2.

When the gel or liquid electrolyte is used, a seal member needs to be used to prevent the electrolyte from leaking to the outside of the bipolar battery. Specifically, as shown in FIG. 4, a seal member 30 is placed between collectors 11 adjacent to each other in the stacking direction so that the collectors 11 and the seal member 30 form a sealing space. In FIG. 4, members having the same functions as those of the members described in Embodiment 1 (FIG. 1) are designated with the same reference numerals.

While the thickness of the solid electrolyte layers 14 is set on the basis of the thickness distribution shown by the curve in section (E) of FIG. 3 in Embodiment 2, the present invention is not limited thereto. Specifically, it is necessary only that the thickness of the solid electrolyte layers 14 should be varied so as to prevent variations in the voltage value among the plurality of unit cells resulting from variations in the temperature in the stacking direction.

For example, it is possible to simply set the thickness of the solid electrolyte layer 14 located in the central layer to be larger than the thickness of a solid electrolyte layer 14 located in an outer layer. This can prevent variations in the voltage value between the unit cell located in the central layer and the unit cell located in the outer layer. The bipolar battery 101 may include at least two solid electrolyte layers 14 having substantially the same thickness.

(Embodiment 3)

Next, a bipolar battery (secondary battery) which is Embodiment 3 of the present invention will be described with reference to FIG. 5 which corresponds to FIG. 2 in Embodiment 1. The section (E) of FIG. 5 shows the relationship between the position in a stacking direction and the resistance value of solid electrolyte layers.

A bipolar battery 102 of Embodiment 3 has a structure substantially similar to that of the bipolar battery 100 described in Embodiment 1. In the following description, members having the same functions as those of the members described in Embodiment 1 are designated with the same reference numerals. The following description will mainly focus on differences from Embodiment 1.

In Embodiment 3, the materials of particle groups contained in solid electrolyte layers 14 are varied depending on the position of the solid electrolyte layer 14 in the stacking direction.

Figure 5:
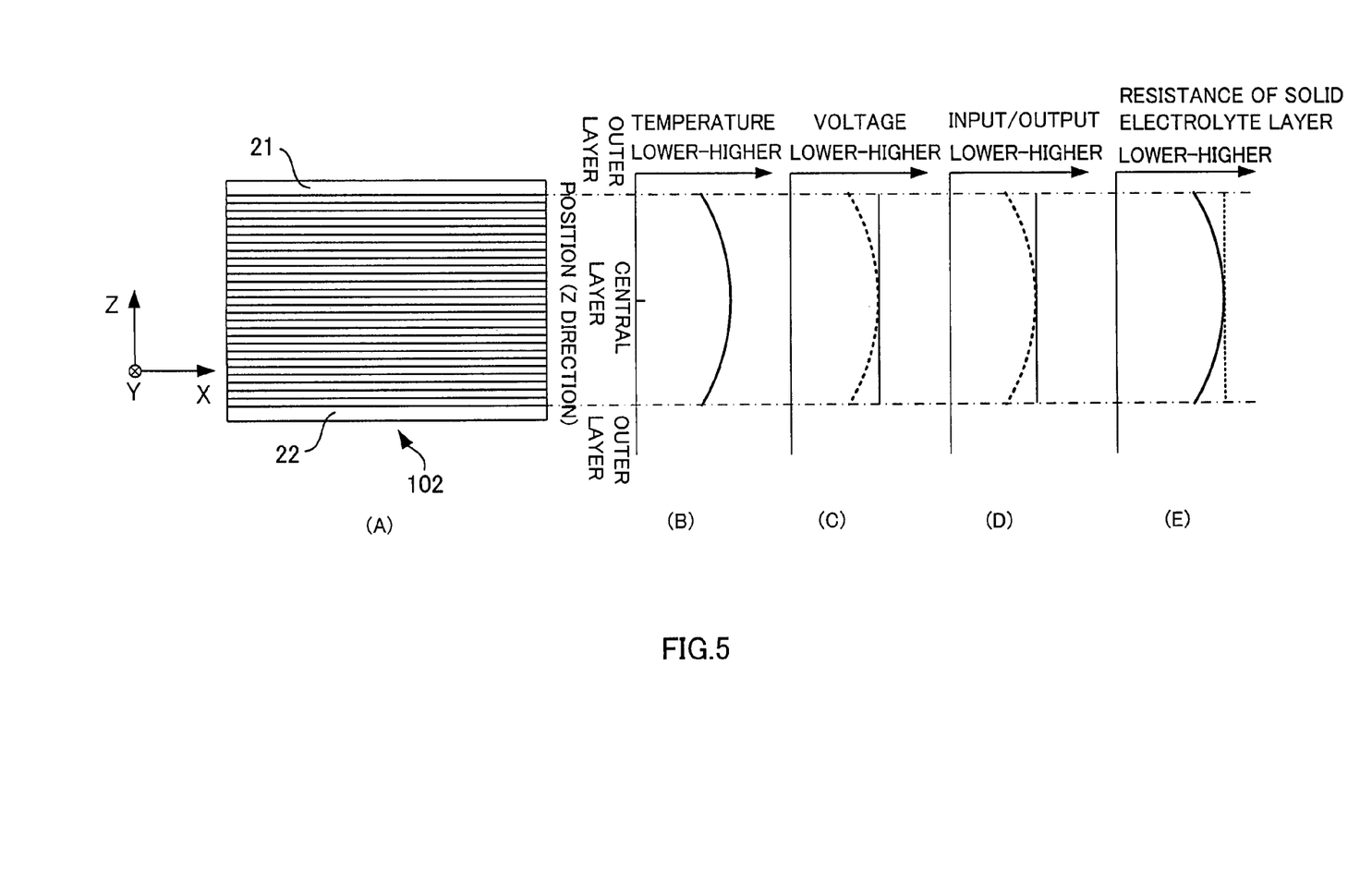
[FIG. 5] Graphs showing the relationships between the position in a stacking direction and the temperature, voltage value, input/output value, and resistance of solid electrolyte layers (types of particle groups) in Embodiment 3 of the present invention (sections A to E).

Specifically, as shown in section (E) of FIG. 5, the materials of the particle groups of the solid electrolyte layers 14 are varied such that the solid electrolyte layer 14 located in the central layer has the highest resistance value and the solid electrolyte layer 14 located in the outer layer has the lowest resistance value. The solid electrolyte layers 14 located between the central layer and the outer layer contain the particle groups made of materials which are varied such that the resistance value thereof is reduced from the central layer to the outer layer.

As described in Embodiments 1 and 2, the density of the particle groups in the solid electrolyte layers 14 or the thickness of the solid electrolyte layers 14 can be varied to provide the different resistance values of the solid electrolyte layers 14. Varying resistance values of the solid electrolyte layers 14 can also be achieved by varying the materials of the particle groups contained in the solid electrolyte layers 14.

The materials of the particle groups can be varied by using particles having different levels of ion conduction or by using particles covered with coatings.

Specific examples of the materials of the particles contained in the solid electrolyte layer 14 and of the levels of ion conduction include $Li_2O$—$B_2O_3$; $10^{-7}$[S/cm], $Li_2O_2$—$SiO_2$; $10^{-6}$[S/cm], $Li_2S$—$GeS_4$; $10^{-5}$[S/cm], $Li_2S$—$P_2S_5$; $10^{-4}$[S/cm], $LiI$—$Li_2S$—$P_2S_5$; $10^{-3}$[S/cm].

When the particles made of different materials are used, different materials may be used or a plurality of materials are mixed at varying ratios depending on the position of the solid electrolyte layer 14. In other words, the particles of the above-mentioned materials can be used as appropriate depending on the position of the solid electrolyte layer 14 in the stacking direction, and the particles of the above mentioned materials (at least two different materials) can be mixed at varying ratios as appropriate.

On the other hand, when the particles covered with coatings are used, the level of ion conduction can be increased or reduced depending on the material of the coating. When a plurality of types of particles (particles having coatings made of different materials) are used, different types of particles may be used or a plurality of (at least two) types of particles may be mixed at varying ratios depending on the position of the solid electrolyte layer 14.

The particles with no coating and the coated particles may be used in combination.

As described in Embodiment 1, the unit cell located in the central layer is at the highest temperature, and the solid electrolyte layer 14 in the unit cell has a lower resistance value. If all of the solid electrolyte layers 14 in the bipolar battery 102 contain the same type of particle group, variations occur in voltage value and input/output value among the plurality of unit cells in the stacking direction as shown by dotted lines in section (C) and (D) of FIG. 5. This is because charge and discharge of the bipolar battery 102 causes an uneven temperature distribution in the stacking direction to produce variations in resistance value among the plurality of unit cells in the stacking direction.

As described above, the type of particle groups (the materials or the mixing ratio of the materials) contained in the solid electrolyte layers 14 is varied depending on the position of the solid electrolyte layer 14 along the stacking direction in Embodiment 3. The type of the particle group in the solid electrolyte layer 14 can be selected as appropriate to increase or reduce the resistance value of the solid electrolyte layer 14.

The resistance value of the solid electrolyte layers 14 is varied previously in this manner depending on the position in the stacking direction. Even when charge and discharge of the bipolar battery 102 causes the uneven temperature distribution shown in section (B) of FIG. 5, it is possible to prevent variations in resistance value among the solid electrolyte layers 14 in the stacking direction. The prevention of variations in resistance value can repress variations in voltage value and input/output value in the bipolar battery 102. For example, as shown by solid lines in section s (c) and (D) of FIG. 5, substantially constant voltage value and input/output value can be accomplished.

The resistance distribution shown in section (E) of FIG. 5 (type of the particle groups) can be set on the basis of the temperature distribution in the stacking direction (section (B) of FIG. 5). Specifically, once the temperature distribution in the stacking direction occurred due to charge and discharge of the bipolar battery is previously determined, the voltage change in each unit cell resulting from the temperature changes can be obtained.

Then, the resistance value of the solid electrolyte layer 14 included in each unit cell can be set on the basis of the voltage change in each unit cell. The resistance value (type of the particle groups) of each solid electrolyte layer 14 can be set so as to prevent the variations in the changed voltage value among the unit cells in the stacking direction.

Embodiment 3 can achieve the similar effects to those in Embodiment 1.

While Embodiment 3 has been described in conjunction with the solid electrolyte layer 14, the present invention is not limited thereto. A liquid or gel electrolyte can be used as in Embodiment 2. In this case, the resistance value of the liquid or gel electrolyte is varied. Specifically, the type of the electrolyte (the materials or the mixing ratio of the materials) may be varied.

While the type of the particle groups in the solid electrolyte layers 14 is set on the basis of the resistance distribution shown by the curve in section (E) of FIG. 5 in Embodiment 3, the present invention is not limited thereto. Specifically, it is necessary only that the type of the particle groups in the solid electrolyte layers 14 should be varied so as to prevent variations in the voltage value among the plurality of unit cells resulting from variations in the temperature in the stacking direction.

For example, it is possible to simply vary the type of the particle groups such that the resistance value of the solid electrolyte layer located in the central layer is larger than the resistance value of the solid electrolyte layer 14 located in the outer layer. This can prevent variations in the voltage value between the unit cell located in the central layer and the unit cell located in the outer layer. The bipolar battery 102 may include at least two solid electrolyte layers 14 containing the same type of particle groups.

(Embodiment 4)

Figure 6:
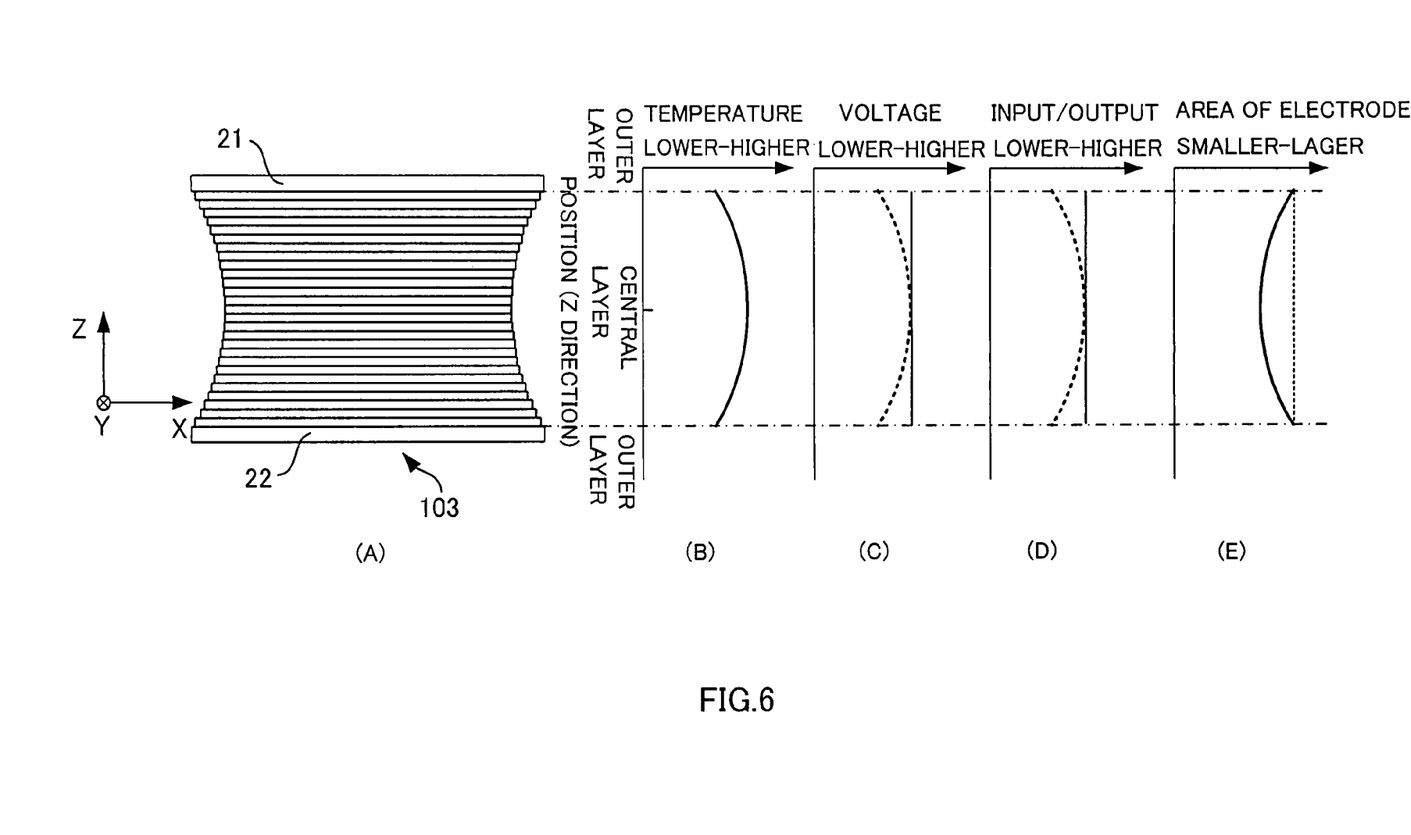
[FIG. 6] Graphs showing the relationships between the position in a stacking direction and the temperature, voltage value, input/output value, and electrode area in Embodiment 4 of the present invention (sections A to E).

Next, a bipolar battery (secondary battery) which is Embodiment 4 of the present invention will be described with reference to FIG. 6 which corresponds to FIG. 2 in Embodiment 1. The section (E) of FIG. 6 shows the relationship between the position in a stacking direction and the area of a bipolar electrode (electrode element).

A bipolar battery 103 of Embodiment 3 has a structure substantially similar to that of the bipolar battery 100 described in Embodiment 1. In the following description, members having the same functions as those of the members described in Embodiment 1 are designated with the same reference numerals. The following description will mainly focus on differences from Embodiment 1.

In the bipolar battery 103 of Embodiment 4, the areas of bipolar electrodes 10 (electrode layers 12 and 13) and of solid electrolyte layers 14 are varied depending on the position in a stacking direction. The area refers to an area or a size in a plane orthogonal to the stacking direction.

Specifically, the bipolar electrode 10 (electrode layers 12 and 13) and the solid electrolyte layer 14 located in the central layer have the smallest areas, while the bipolar electrode 10 (electrode layers 12 and 13) and the solid electrolyte layer 14 located in the outer layer have the largest areas. The bipolar electrodes 10 and the solid electrolyte layers 14 located between the central layer and the outer layer are formed such that the areas of the bipolar electrodes 10 (electrode layers 12 and 13) and of the solid electrolyte layers 14 are increased from the central layer to the outer layer.

The areas of the bipolar electrodes 10 (electrode layers 12 and 13) and of the solid electrolyte layers 14 in contact therewith can be varied as in Embodiment 4 to provide varying resistance values among unit cells depending on the position in the stacking direction. When the areas of the bipolar electrode 10 and of the solid electrolyte layer 14 in contact therewith are reduced, the resistance value can be increased. When the areas of the bipolar electrode 10 and of the solid electrolyte layer 14 in contact therewith are increased, the resistance value can be reduced.

As described in Embodiment 1, the unit cell located in the central layer is at the highest temperature, and the unit cell has a lower resistance value. If all of the bipolar electrodes 10 and the solid electrolyte layers 14 in the bipolar battery 103 have the same areas, variations occur in voltage value and input/output value among the plurality of unit cells in the stacking direction as shown by dotted lines in sections (C) and (D) of FIG. 6. This is because charge and discharge of the bipolar battery 103 causes an uneven temperature distribution in the stacking direction to produce variations in resistance value among the plurality of unit cells in the stacking direction.

As described above, the areas of the bipolar electrodes 10 and of the solid electrolyte layers 14 are varied depending on the position in the stacking direction to provide the varying resistance values among the unit cells in the stacking direction in Embodiment 4.

The resistance value of the unit cells is varied previously in this manner depending on the position in the stacking direction. Even when charge and discharge of the bipolar battery 103 causes the uneven temperature distribution shown in section (B) of FIG. 6, it is possible to prevent variations in resistance value among the unit cells in the stacking direction. The prevention of variations in resistance value can repress variations in voltage value and input/output value in the bipolar battery 103. For example, as shown by solid lines in sections (C) and (D) of FIG. 6, substantially constant voltage value and input/output value can be accomplished.

The area distribution shown in section (E) of FIG. 6 can be set on the basis of the temperature distribution in the stacking direction (section (B) of FIG. 6). Specifically, once the temperature distribution in the stacking direction occurred due to charge and discharge of the bipolar battery 103 is previously determined, the voltage change in each unit cell resulting from the temperature changes can be obtained.

Then, the areas of the bipolar electrode 10 and of the solid electrolyte layer 14 included in each unit cell can be set on the basis of the voltage change in each unit cell. The areas of the bipolar electrode 10 and of the solid electrolyte layer 14 can be set so as to prevent the variations in the changed voltage value among the unit cells in the stacking direction.

Embodiment 4 can achieve the similar effects to those in Embodiment 1. In addition, Embodiment 4 allows a reduction in the weight of the bipolar battery (assembled battery) 103 since the areas of the bipolar electrodes 10 and of the solid electrolyte layers 14 are reduced from the outer layer to the central layer.

While Embodiment 4 has been described in conjunction with the solid electrolyte layer 14, the present invention is not limited thereto. A liquid or gel electrolyte can be used as in Embodiment 2.

While the areas of the bipolar electrodes 10 and of the solid electrolyte layers 14 are set on the basis of the area distribution shown by the curve in section (E) of FIG. 6 in Embodiment 4, the present invention is not limited thereto. Specifically, it is necessary only that the areas of the bipolar electrodes 10 and of the solid electrolyte layers 14 should be varied so as to prevent variations in the voltage value among the plurality of unit cells resulting from variations in the temperature in the stacking direction.

For example, it is possible to simply set the areas of the bipolar electrode 10 and of the solid electrolyte layer 14 located in the central layer to be smaller than the areas of a bipolar electrode 10 and of the solid electrolyte layer 14 located in the outer layer. This can prevent variations in the voltage value between the unit cell located in the central layer and the unit cell located in the outer layer. The bipolar battery 103 may include at least two unit cells which have the bipolar electrodes 10 and the solid electrolyte layers 14 with the same areas.

While Embodiment 4 has the structure in which the bipolar battery (assembled battery) 103 has a curvature on both sides (sides in an X direction) as shown in section (A) of FIG. 6, the present invention is not limited thereto.

Specifically, it is essential only that the areas of the bipolar electrodes 10 and of the solid electrolyte layers 14 should be varied depending on the position in the stacking direction. For example, it is possible that the bipolar battery (assembled battery) may have a one side with a curvature and the other side formed substantially flat. In other words, the stacked bipolar electrodes 10 and solid electrolyte layers 14 can have one sides aligned in the stacking direction.

The bipolar electrode 10 and the solid electrolyte layer 14 may have any form when viewed from the stacking direction. For example, the bipolar electrode 10 and the solid electrolyte layer 14 may be formed in a rectangular shape or a circular shape. This applies to Embodiments 1 to 3.

In Embodiments 1 to 4 described above, the structures of the solid electrolyte layers 14 are varied in view of the temperature distribution in the assembled battery formed of the plurality of stacked unit cells. When the assembled battery is influenced by external thermal effects and thus the temperature distribution thereof is changed in the stacking direction, the structure of the solid electrolyte layers 14 can be varied on the basis of that temperature distribution. This will be described specifically.

For example, when a heat source such as an engine and a motor is disposed near the assembled battery, the thermal effects from the heat source may raise the temperature (in other words, reduce the heat radiation) in a unit cell closer to the heat source as compared with other unit cells.

To address this, the resistance value of the unit cell (solid electrolyte layer) of a plurality of unit cells (solid electrolyte layers) that is located closer to the heat source can be set to be higher than that of the other unit cells to prevent variations in voltage value among the plurality of unit cells in the stacking direction.

Specifically, the resistance value of a single or a plurality of unit cells located closer to the heat source (in one of the two outer layers in the stacking direction) can be set to be higher than the resistance value of another unit cell (for example, the unit cell located in the other outer layer in the stacking direction).

The resistance value of the unit cells can be varied in the manner described in Embodiments 1 to 4. Specifically, the varying resistance values can be achieved by varying the density of the particle groups in the solid electrolyte layers 14 or by varying the thickness of the solid electrolyte layer 14. The varying resistance value can also be achieved by varying the type (the materials or the mixing ratio of the materials) of the particle groups contained in the solid electrolyte layers 14 or by varying the areas of the bipolar electrodes 10 and of the solid electrolyte layers 14.

Embodiments 1 to 4 described above are realized by varying the density of the particle groups in the solid electrolyte layers 14, the thickness of the solid electrolyte layers 14, the type of the particle groups in the solid electrolyte layers 14, and the areas of the bipolar electrodes 10 and of the solid electrolyte layers 14 depending on the position in the stacking direction. At least two of those four parameters may be varied. In this case, it is also necessary only that the resistance value of the unit cell at the position with lower heat radiation (for example in the central layer) should be larger than the resistance value of the unit cell at the position with higher radiation (for example in the outer layer).

The secondary battery described in each of Embodiments 1 to 4 can be used as a power storage device for driving a motor in an electric vehicle (EV), a hybrid electric vehicle (HEV), and a fuel cell vehicle (FCV), for example.

The invention claimed is:

1. A power storage device comprising:
a plurality of electrode elements; and
a plurality of electrolyte layers which are stacked with the electrode element interposed between them,
wherein the plurality of electrolyte layers include,
an electrolyte layer provided at a first position in a stacking direction; and
an electrolyte layer provided at a second position that is more centrally located in the stack than the first position, heat radiation being lower at the second position than at the first position, and
wherein the electrolyte layer at the second position has a higher electrical resistance value than a electrical resistance value of the electrolyte layer at the first position.

2. The power storage device according to claim 1, wherein the electrolyte layer is a solid electrolyte layer containing a group of particles, and
the electrolyte layer at the second position contains the group of particles at a density lower than a density of the group of particles contained in the electrolyte layer at the first position.

3. The power storage device according to claim 1, wherein the electrolyte layer at the second position has a thickness larger than a thickness of the electrolyte layer at the first position.

4. The power storage device according to claim 1, wherein a type of material forming the electrolyte layer at the first position is different from a type of the electrolyte layer at the second position.

5. The power storage device according to claim 1, wherein the electrolyte layer at the second position and the electrode element in contact with the electrolyte layer at the second position are smaller than the electrolyte layer at the first position and the electrode element in contact with the electrolyte layer at the first position in a plane orthogonal to the stacking direction.

* * * * *